United States Patent [19]

Koyama

[11] Patent Number: 5,163,076

[45] Date of Patent: Nov. 10, 1992

[54] X-RAY IMAGE DISPLAY APPARATUS

[75] Inventor: Katsuhiko Koyama, Irvine, Calif.

[73] Assignee: Kabushiki Kaisha Toshiba, Kawasaki, Japan

[21] Appl. No.: 784,716

[22] Filed: Oct. 30, 1991

[30] Foreign Application Priority Data

Oct. 31, 1990 [JP] Japan .................. 2-291948

[51] Int. Cl.⁵ .................. A61B 6/02; G03C 9/00
[52] U.S. Cl. .................. 378/42; 378/41; 378/99; 358/111
[58] Field of Search .................. 378/41, 42, 62, 99; 358/111

[56] References Cited

U.S. PATENT DOCUMENTS

| | | | |
|---|---|---|---|
| 3,076,054 | 1/1963 | Simon | 178/6.5 |
| 3,244,878 | 4/1966 | Stein | 250/60 |
| 3,424,901 | 1/1969 | Kok | 250/60 |
| 4,214,267 | 7/1980 | Roese et al. | 358/111 |
| 4,383,328 | 5/1983 | Kurihara et al. | 378/42 |
| 4,544,949 | 10/1985 | Kurihara | 358/111 |
| 4,578,802 | 3/1986 | Itoh | 378/41 |
| 4,658,410 | 4/1987 | Haendle et al. | 378/41 |
| 4,878,115 | 10/1989 | Elion | 378/99 |
| 5,054,045 | 10/1991 | Whiting et al. | 378/99 |
| 5,056,524 | 10/1991 | Oe | 378/99 |
| 5,077,769 | 12/1991 | Franciose | 378/196 |

Primary Examiner—David P. Porta
Attorney, Agent, or Firm—Oblon, Spivak, McClelland, Maier & Neustadt

[57] ABSTRACT

According to the present invention, there is provided an X-ray image display apparatus to display an image of an object under test to which X-ray is irradiated comprising an image processor which the following functions: to form for right and left eyes a pair of stereoscopic subtraction X-ray images of the object under test that is to be given contrast medium and the object under test that has been given contrast medium, to form for either one of the right and left eyes a monoscopic subtraction X-ray image of the object under test that is to given contrast medium and the object under test that has been given insertion, to synthesize for the either one eye the stereoscopic subtraction X-ray image and the monoscopic subtraction X-ray image, and to display for the either one eye the X-ray image synthesized and for the other eye the stereoscopic subtraction X-ray image. The X-ray iamge display apparatus makes it possible to provide sterepscopic views of a desired part of the object under test.

8 Claims, 5 Drawing Sheets

FOR RIGHT EYE

FOR LEFT EYE

X-RAY IMAGE DISPLAY APPARATUS

BACKGROUND OF THE INVENTION

The present invention relates to an X-ray image display apparatus and, in particular, to an X-ray image display apparatus which is useful for interventional angiography where blood vessels and a moving catheter inserted thereinto are imaged.

So far, in order to get a stereoscopic X-ray image, the following X-ray imaging system and steps have been used. An X-ray tube that has two X-ray focuses emits continuous X-ray pulses transmitting an object under test given some contrast medium alternatively toward each focus. The transmitting X-ray enters an X-ray detector, which produces video signal in proportion to the intensity distribution of the incident X-ray and transmits the video signal to an X-ray image display device.

In response to the video signal, images of the object under test corresponding to each focus are displayed on a screen of the display device alternatively in successive frames. These images are observed through an appropriate stereoscope means like a combination of a polarization shutter and polarization eyeglasses, or a stereoscopic viewer, thus providing a right-eye projected image and a left-eye projected one corrsponding to each focus, respectively.

However, if angiography, especially interventional angiography is executed with the above-described X-ray image apparatus and blood-vessel contrast medium, it is difficult to observe a moving catheter inside one specific blood vessel in continuing frames and to manipulate a catheter desirably through the blood vessel since plenty of blood vessels, bones, etc. are displayed with being overlapped manifold and flat.

SUMMARY OF THE INVENTION

Accordingly, it is an object of the present invention to provide an X-ray image display apparatus which can provide a stereoscopic view of desired parts only and are particularly helpful for interventional angiography.

To achieve the foregoing object, an X-ray image display apparatus to display an image of an object under test to which X-ray is irradiated is provided, comprising: means for forming for right and left eyes a pair of stereoscopic subtraction X-ray images of the object under test that is to be given contrast medium and the object under test that has been given contrast medium; means for forming for either one of the right and left eyes a monoscopic subtraction X-ray image of the object under test that is to given contrast medium and the object under test that has been given insertion; means for synthesizing for the either one eye the stereoscopic subtraction X-ray image and the monoscopic subtraction X-ray image; and means for displaying for the either one eye an X-ray image synthesized by the synthesizing means and for the other eye the stereoscopic subtraction X-ray image.

DESCRIPTION OF THE PREFERRED EMBODIMENTS

Figure 1:
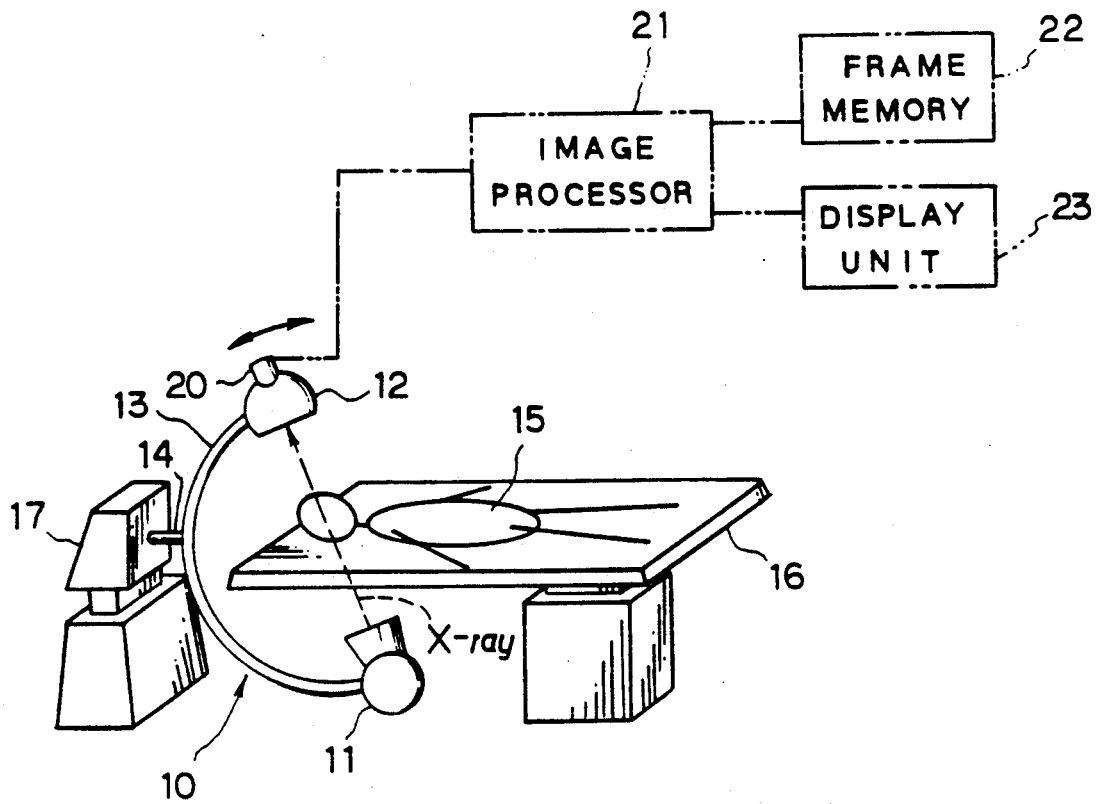
FIG. 1 is a schematic illustration of an X-ray imaging system including an X-ray image display apparatus in accordance with one embodiment of the present invention.

Embodiments of the present invention will now be described in detail with reference to FIGS. 1 to 6, where components common in each embodiment will be referred to by the same reference numerals and codes.

FIG. 1 is a perspective view of an X-ray imaging system 10 including an X-ray image display apparatus in accordance with one embodiment of the present invention.

The X-ray imaging system 10 is furnished with an X-ray tube 11 with single focus and an X-ray detector 12 both attached to a C-shaped arm 13 which is rotatable around a shaft 14 of a supporter 17. The X-ray tube 11 and the X-ray detector 12 face to each other with an object under test 15 lying down on a couch 16 therebetween. In a preferred embodiment, the X-ray detector 12 comprises an image intensifier to generate an image frame. X-ray emitted by the X-ray tube 11 passes through the couch 16 and the object under test 15 and gets into the X-ray detector 12.

The X-ray detector 12 is neighbored by an optical sensor 20 to scan the image frames, which in preferred embodiment is a television camera, to produce a video signal corresponding to the image frames. The video signal produced by the optical sensor 20 is transmitted to an image processor 21 for analog/digital (A/D) conversion, image processing, etc. The video signals which were subject to various processings at the image processor 21 are temporarily stored at an frame memory 22 or are transmitted to a display unit 23, which displays images based on the video signal.

Figure 2:
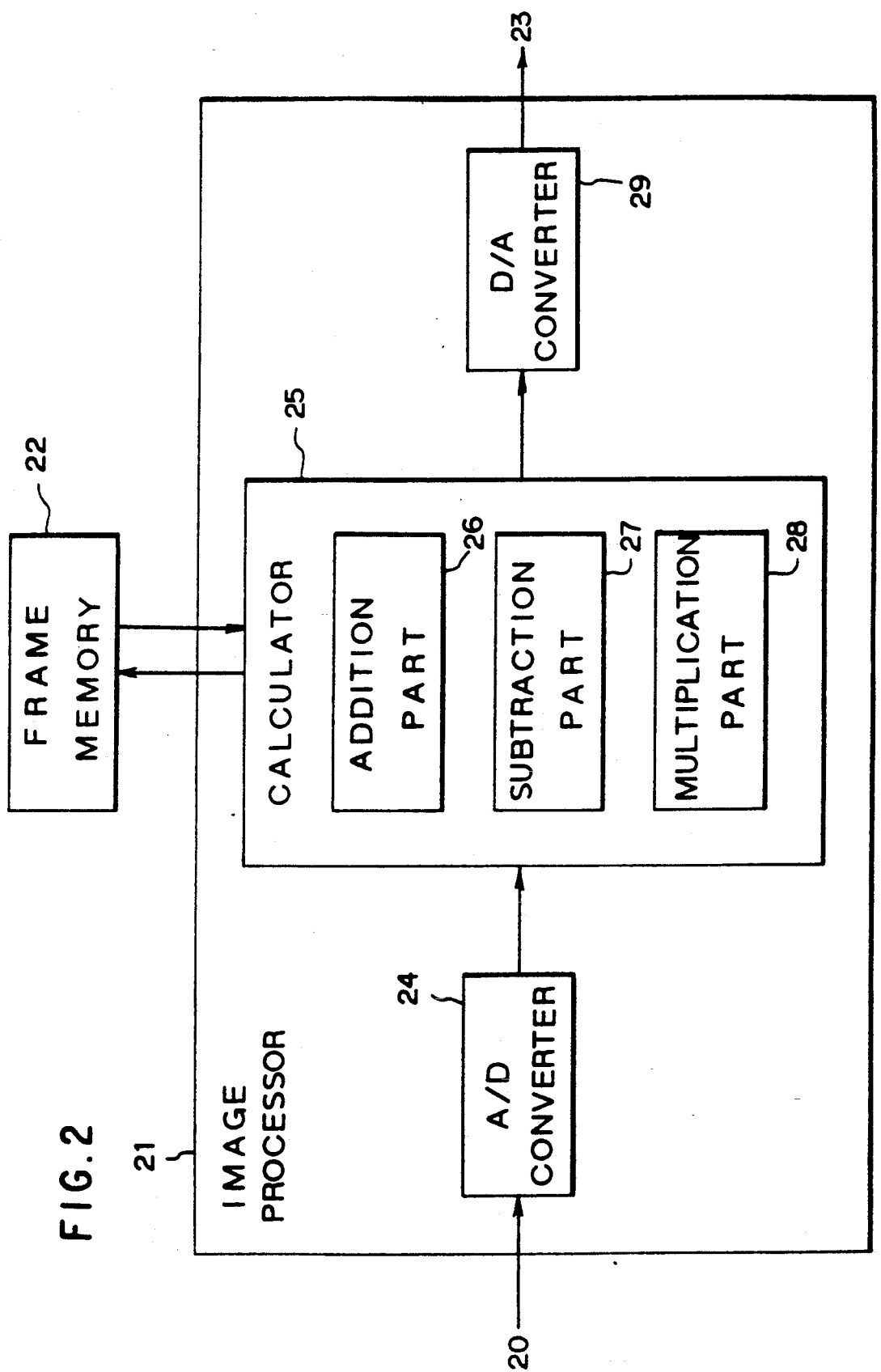
FIG. 2 represents a block diagram of an image processor included in the X-ray image display apparatus of FIG. 1.

As shown in FIG. 2, in the image processor 21, the video signal input form the optical sensor 20 is first subject to A/D conversion by an A/D converter 24. The digitized video signal is sent out to a calculator 25 for various image processings, which is provided with an addition part 26, a subtraction part 27 and a multiplication part 28.

In the addition part 26 and the subtraction part 27 addition and subtraction are made, respectively, between a plurality of values of video signals (in other words, image values). On the other hand, in the multiplication part 28 the video signal is multiplied by some coefficient. The calculator 25 sends out the video signals to the frame memory 23 on occasion. Otherwise, the video signal which has got out of the calculator 25 goes through a D/A (digital/analog) converter 29 for D/A conversion and enters the display unit 23 finally.

Figure 3:
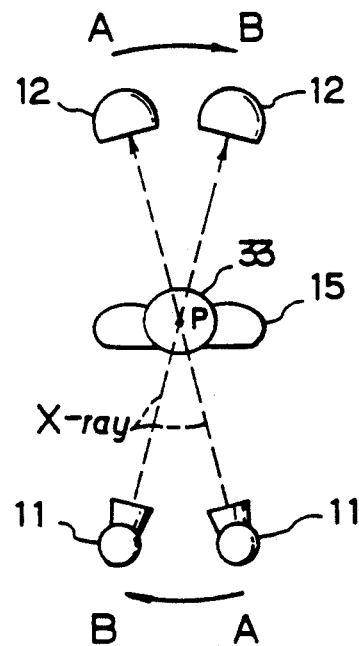
FIG. 3 is a schematic illustration of the stereoscopic X-ray fluoroscope using the X-ray imaging system of FIG. 1.

As shown in FIG. 3, when an operator carrys out stereoscopic X-ray fluoroscope with the X-ray imaging system 10, he or she makes the X-ray tube 11 to emit the X-ray at certain position A, in the first place, in the direction of one point P at a head 33 of the object under test 15. The X-ray detector 12 detects the intensity distribution of the X-ray that has passed the point P. This operation is an ordinary fluoroscope (not stereoscopic fluoroscope), thus causing a plane image. The inventor refers to these fluoroscope and image as "monoscopic fluoroscope" and "monoscopic image", respectively.

Then, the C-shaped arm 13 is made to rotate centering around the aforementioned point P. Consequently, the X-ray tube 11 and the X-ray detector 12 move together to position B. The preceding monoscopic fluoroscope is implemented again at the position B. The X-ray detector 12 at the position A and the position B can be considered a right eye and a left eye of an observer, respectively.

Thus, the images created, which are based on the X-ray intensity distribution detected by the X-ray detector 12 at the positions A and B, respectively, can be regarded a righteye projected image and a left-eye projected one.

If the images which were obtained by the X-ray detector 12 at the position A and the position B are displayed at the display unit 23 with being overlapped (i.e. rapidly and alternatively displayed at the same location) and the aforementioned right-eye and the left-eye projected images are Observed by the right eye and left eye, respectively, through a stereoscope means such as a combination of a polarization shutter and polarization eyeglasses, then these images look stereoscopic. The distance between the positions A and B is preferably 30–60 mm to get a better depth view suitable for a stereoscopic image. Hence, the operation hereinbefore can be called "stereoscopic X-ray fluoroscope".

Figure 4:
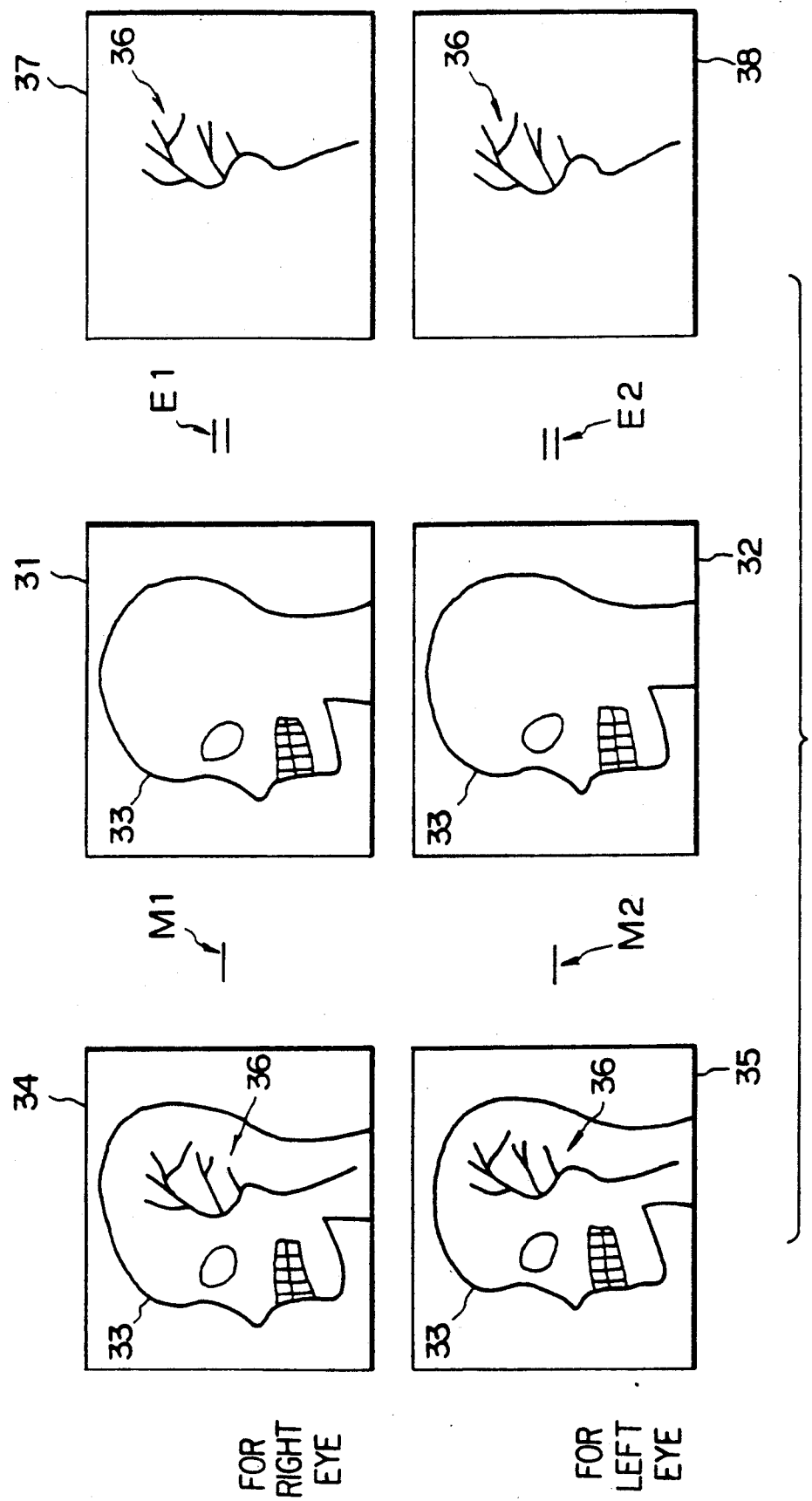
FIG. 4 is a schematic illustration representing steps to create a pair of stereoscopic images of blood vessels with the X-ray imaging system of FIG. 1.
Figure 5:
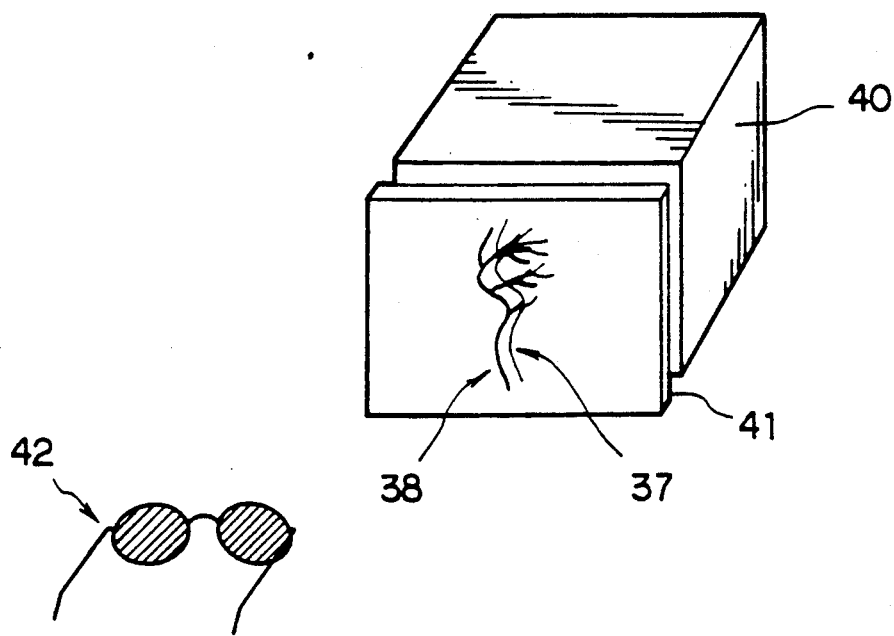
FIG. 5 is a schematic illustration of a display unit and stereoscope instruments included in the X-ray imaging system of FIG. 1.
Figure 6:
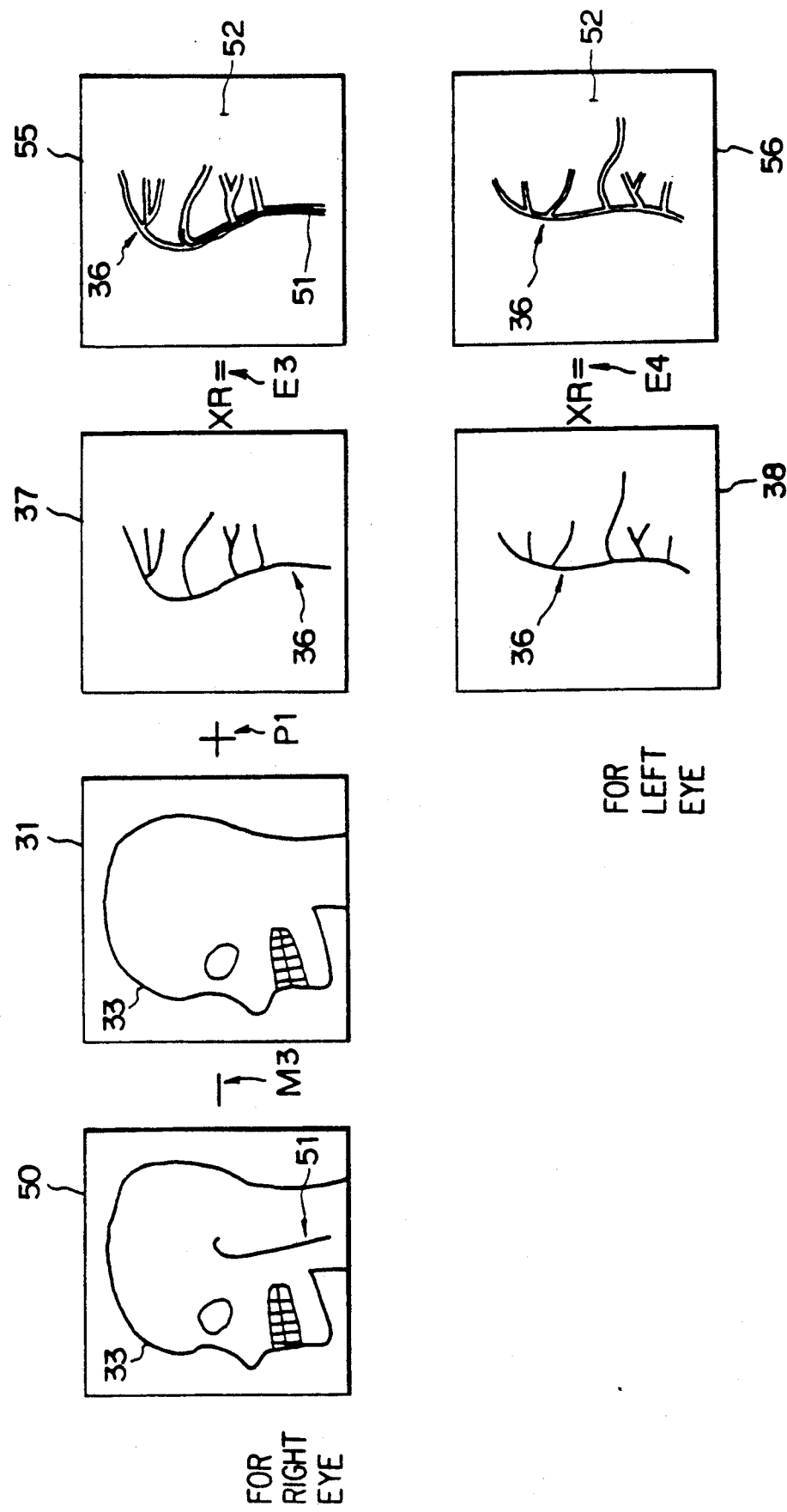
FIG. 6 is a schematic illustration representing steps to create an interventional angiography images in the X-ray imaging system of FIG. 1.

Next, interventional angiography of a head employing the X-ray imaging system 10 will be explained with reference to FIGS. 4 to 6.

To begin with, a "stereomask image" is made as the first step. Namely, the above-mentioned stereoscopic X-ray fluoroscope of a head using the X-ray tube 11 with single focus is implemented at positions A and B before any of the blood-vessel contrast medium is given to the object under test 15. The two images 31 and 32 of the head 33 shown in FIG. 4 which correspond to positions A and B are obtained for the right and left eyes, respectively, and are stored in the frame memory 22. A pair of stereoscopic images 31, 32 is called "stereomask image" because these two images 31 and 32 are used to mask parts except blood vessels of the stereoscopic images which will be acquired in the same way after the blood-vessel contrast medium is given.

In the second step, after blood-vessel contrast medium is given to the object under test 15, the sam stereoscopic X-ray fluoroscope as that Of the first step is repeated. Consequently, the two images 34 and 35 shown in FIG. 4, where lots of blood vessels 36 clearly show up besides the same contents with those of the images 31, 32, are obtained for the right and left eyes, respectively.

Next, in the third step, a "stereo-road-map image" is created. A pair of stereoscopic images 34, 35 are digitized at the A/D converter 24 of the image processor 21. Therefore, recalling the stereomask images 31, 32, which have been already digitized, from the frame memory 22, the digital image values of stereomask images 31, 32 are algebraically subtracted from those of the stereoscopic images 34, 35, respectively, for the right and left eyes at the subtraction part 27 of the image processor 21 (as represented by minus signs M1, M2).

As a result, a pair of stereoscopic images 37, 38 is obtained (as represented by equal marks E1, E2), in which there remain only stereoscopic images of blood vessels 36. These two images 37, 38 are called "stereo-road-map image" because these images 37, 38 will be used as a road map (network of blood vessels 36 is regarded "road map") along which a catheter inserted into the blood vessels will be moved. These two stereo-road-map images 37, 38 are stored at the frame memory 22 as well.

Incidentally, the way to observe stereoscopic images in the X-ray imaging system 10 will be explained hereinafter with reference to FIG. 5.

That is to say, on one hand, a 120-Hz monitor 40 including a cathode ray tube which can display 120 frames a second, for example, is used for the display unit 22. On the other hand, a combination of a polarization shutter 4 and polarization eyeglasses 42 is employed as the stereoscope means. The polarization eyeglasses 42 include a right-eye part and a left-eye part which transmit the light whose directions of polarization are different 90° from each other.

The 120-Hz monitor 40 displays the right-eye stereo-road-map 37 and the left-eye stereo-road-map 38 alternatively at a frame rate of 60 frames each (totally 120 frames) per second. Responding to change of the right-eye stereo-road-map image 37 and the left-eye stereo-road-map image 38, the polarization shutter 41 transmits the light from these stereo-road-map 37, 38, whose directions of polarization are different 90° from each other.

Therefore, the observer can look at the the right-eye stereo-road-map 37 and the left-eye stereo-road-map 38 by his or her right and left eyes, respectively, through the polarization eyeglasses 42 and can recognize plenty of overlapped blood vessels 36 as stereoscopic images with depth view. Meanwhile, the frame rate of the 120-Hz monitor 40 is so fast that these stereo-road-map images 37, 38 look continuous for the eyes of an observer due to the so-called afterimage phenomenon.

By the way, in the interventional angiography of a head, it is necessary to get a real-time image of a catheter inserted into a blood vessel of a head. Because a doctor under operation manipulates a catheter, watching the moving of the catheter inside the blood vessels at the display unit 23.

According to the present embodiment, the monoscopic X-ray tube 11 is used to get the image of catheter at the position A, for instance, as the forth step. Thus, as seen from FIG. 6, a monoscopic image 50 of the head 33 including a catheter 51 is obtained. This image 50 will be used for the right eye in the following image processing. In this step, the C-shaped arm 13 remain still because there is no time to rotate the C-shaped arm and make the stereoscopic fluoroscope for the real-time display.

The image 50 is digitized at the A/D converter 24 of the image processor 21, and the right-eye stereomask image 31 and the stereo-road-map images 37, 38 are recalled from the frame memory 22. Then, the digital image values of the image 50 are subtracted from those of the right-eye stereomask image 31 at the subtraction part 27 of the calculator 25 (as represented by minus sign M3). In this way, the image including only the catheter 51 is obtained (not shown).

Next, the image values of the right-eye stereo-road-map image 37 get multiplied by a suitable contrast ratio R at the multiplication part 28 (as represented by a sign "x R") in order to make the image of blood vessels 36 clearer to the extent that the doctor under operation can easily recognize. Subsequently, the image values of the stereo-road-map image 37 multiplied by the contrast ratio R are added to those of the foregoing image including only the catheter 51 at the addition part 26 (as represented by a plus sign P1").

Hence, the image 55 of the head blood vessels 36 including the catheter 51 for the right eye is obtained (as represented by an equal mark E3). Generally, the image of the blood vessels 36, the catheter 51 and the background 52 become gray, black and white, respectively. This contrast magnification is accomplished similarly for the left-eye stereo-road-map image 38 (as represented by a sign "x R"), thus forming the stereoscopic image 56 for the left eye (as represented by an equal sign E4).

In terms of a pair of images 55, 56, although a live image of catheter 51 is monoscopic at the image 35, the images of blood vessels 36 included in the images 55, 56 are stereoscopic. Therefore, the doctor who manipulates the catheter 51 wears the polarization eyeglasses 42 and can recognize a specific blood vessel among many overlapped blood vessels, through which the catheter 51 should be moved on the screen of the 120-Hz monitor 40.

Accordingly, the doctor is able to accurately forward the catheter 51 through the specific blood vessel, watching this pair of real-time stereoscopic images 55, 56 with the moving catheter 51 and the blood vessels included.

The present embodiments render it possible to get stereoscopic images of a desired part of an object under test (blood vessels in the above embodiments), thus making it possible to execute interventional angiography smoothly and accurately.

The present invention should not be considered to be limited to the above-described preferred embodiments. Many modification made in relation to the aforementioned embodiments might fall within the scopes of the following claims of the present invention.

What is claimed is:

1. An X-ray image display apparatus to display an image of an object under test to which X-ray is irradiated comprising:
   means for forming for right and left eyes a pair of stereoscopic subtraction X-ray images of the object under test that is to be given contrast medium and the object under test that has been given contrast medium;
   means for forming for either one of the right and left eyes a monoscopic subtraction X-ray image of the object under test that is to given contrast medium and the object under test that has been given insertion;
   means for synthesizing for the either one eye the stereoscopic subtraction X-ray image and the monoscopic subtraction X-ray image; and
   means for displaying for the either one eye an X-ray image synthesized by the synthesizing means and for the other eye the stereoscopic subtraction X-ray image.

2. The X-ray image display apparatus according to claim 1, wherein the X-ray image display apparatus further comprises means for memorizing the stereoscopic subtraction X-ray image.

3. The X-ray image display apparatus according to claim 1, wherein the contrast medium includes blood-vessel contrast medium and the means for forming a pair of stereoscopic subtraction X-ray images includes means for forming stereo-road-map images.

4. The X-ray image display apparatus according to claim 3, wherein the insertion includes a catheter and the means for forming a monoscopic subtraction X-ray image includes means for forming a monoscopic subtraction image X-ray of the catheter.

5. The X-ray image display apparatus according to claim 4, wherein the synthesizing means includes means for forming an interventional angiography image including the stereo-road-map images and the monoscopic subtraction X-ray image of the catheter.

6. The X-ray image display apparatus according to claim 5, wherein the displaying means includes a cathode ray tube alternatively displaying the interventional angiography image for the either eye and the stereo-road-map image for the other eye.

7. An X-ray stereoscopic fluoroscope system for testing an object under test, including the X-ray image display apparatus of claim 1, further comprising:
   an X-ray tube with single focus for emitting X-ray toward the object under test;
   an X-ray detector for detecting the X-ray that has transmitted to the object under test;
   a support means for rotatably supporting both of the X-ray tube and the X-ray detector; and
   a stereoscope means.

8. The X-ray stereoscopic fluoroscope system according to claim 7, wherein the stereoscope means comprises a combination of a polarization shutter and polarization eyeglasses.

* * * * *

UNITED STATES PATENT AND TRADEMARK OFFICE
CERTIFICATE OF CORRECTION

PATENT NO. : 5,163,076

DATED : November 10, 1992

INVENTOR(S) : Katshuiko Koyama

It is certified that error appears in the above-identified patent and that said Letters Patent is hereby corrected as shown below:

IN THE ABSTRACT

Line 4, please change "which" to --with--;

Line 17, please change "iamge" to --image--; and

Line 18, please change "sterepscopic" to --stereoscopic--;

Column 1, line 37, after "overlapped" insert --,--;

Column 2, line 47, after "stored" insert --in a--;

Column 2, line 51, please change "form" to --from--;

Column 3, line 22, insert a hyphen between "right" and "eye";

Column 3, line 29, please change "Observe" to --observe--;

Column 3, line 55, after "The" insert --same--;

Column 3, line 56, change "OF" to --of--; and

Column 5, line 44, change "modification" to --modifications--.

Signed and Sealed this

Fourth Day of January, 1994

*Attest:*

BRUCE LEHMAN

*Attesting Officer*     *Commissioner of Patents and Trademarks*